(12) United States Patent
Flask et al.

(10) Patent No.: US 7,873,322 B2
(45) Date of Patent: Jan. 18, 2011

(54) INGRESS SUSCEPTIBILITY ON RETURN PATH

(75) Inventors: Robert J. Flask, New Palestine, IN (US); Kevin J. Oliver, Fishers, IN (US)

(73) Assignee: Acterna LLC, Germantown, MD (US)

( * ) Notice: Subject to any disclaimer, the term of this patent is extended or adjusted under 35 U.S.C. 154(b) by 556 days.

(21) Appl. No.: 11/931,346

(22) Filed: Oct. 31, 2007

(65) Prior Publication Data

US 2008/0064349 A1    Mar. 13, 2008

Related U.S. Application Data

(63) Continuation-in-part of application No. 11/151,956, filed on Jun. 14, 2005, now abandoned.

(60) Provisional application No. 60/950,204, filed on Jul. 17, 2007.

(51) Int. Cl.
  H04B 1/00    (2006.01)
  H04B 17/00   (2006.01)

(52) U.S. Cl. .............................. 455/67.11; 455/226.13; 455/67.13; 455/63.1

(58) Field of Classification Search ................ 455/3.01, 455/161.2, 67.11, 67.13, 226.1, 63.1
  See application file for complete search history.

(56) References Cited

U.S. PATENT DOCUMENTS

| | | | | |
|---|---|---|---|---|
| 5,623,422 A | * | 4/1997 | Williams | 709/240 |
| 5,790,523 A | * | 8/1998 | Ritchie et al. | 370/241 |
| 5,943,604 A | * | 8/1999 | Chen et al. | 455/3.06 |
| 6,032,019 A | * | 2/2000 | Chen et al. | 725/124 |
| 6,160,990 A | * | 12/2000 | Kobayashi et al. | 725/135 |
| 6,166,760 A | * | 12/2000 | Kay | 725/107 |
| 6,425,132 B1 | * | 7/2002 | Chappell | 725/107 |
| 6,530,087 B1 | * | 3/2003 | Kobayashi et al. | 725/125 |
| 6,978,476 B2 | * | 12/2005 | Zimmerman | 348/192 |
| 7,152,025 B2 | * | 12/2006 | Lusky et al. | 703/18 |
| 7,254,828 B2 | * | 8/2007 | Hunter | 455/63.1 |
| 7,418,240 B2 | * | 8/2008 | Hsu et al. | 455/67.13 |
| 7,519,082 B2 | * | 4/2009 | Quigley et al. | 370/468 |
| 2002/0095686 A1 | * | 7/2002 | Shi et al. | 725/107 |
| 2002/0199202 A1 | * | 12/2002 | Hunter | 725/105 |
| 2003/0022645 A1 | * | 1/2003 | Runzo | 455/226.2 |

\* cited by examiner

*Primary Examiner*—Tilahun Gesesse
(74) *Attorney, Agent, or Firm*—Matthew A. Pequignot; Pequignot + Myers LLC

(57) ABSTRACT

The testing device of the present invention includes an RF input for connecting to a subscriber network, which has been disconnected from a communication network, for receiving ingress RF signals leaked into the subscriber network from outside sources. The device includes a signal processor for scanning the RF signals for power levels at a plurality of frequencies, and generating power level signals based at least in part on the power levels. Ideally, the power levels are compared to a threshold power level representing an acceptable amount of ingress, and a pass/fail indicator is displayed based on whether the power levels exceed the threshold power level.

20 Claims, 9 Drawing Sheets

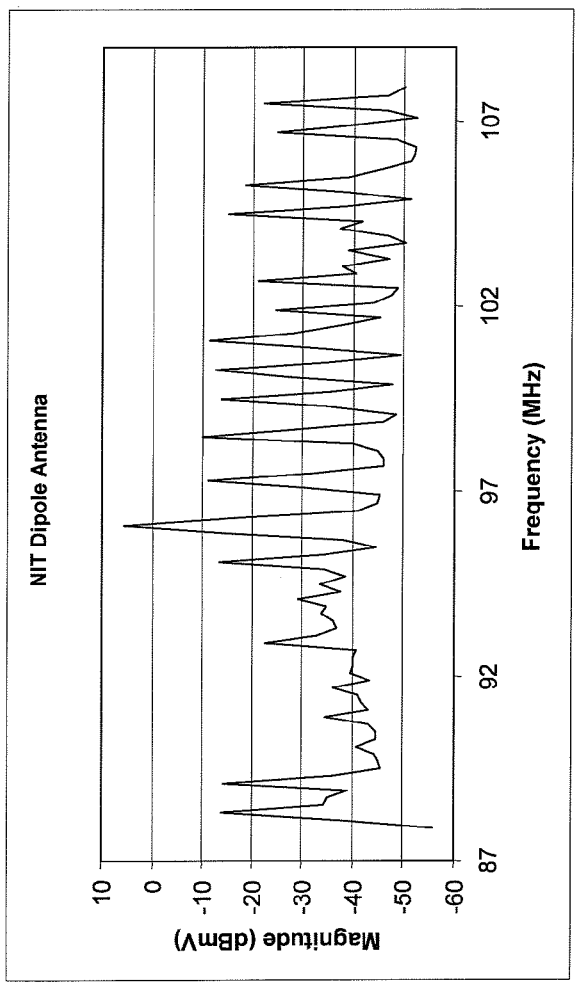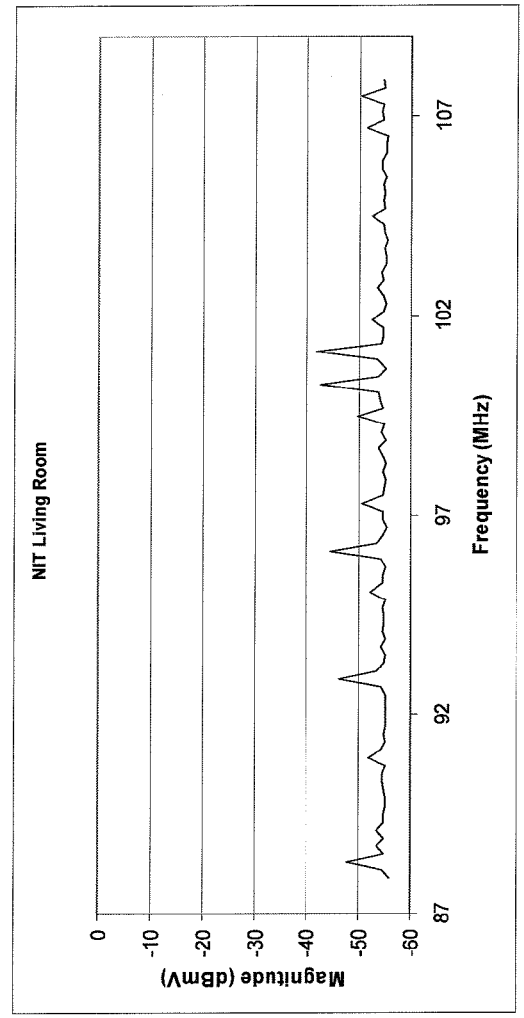
Figure 7
Figure 8

Figure 11

| Noise Immunity Test |  |  |
|---|---|---|
| FAIL | | |
| connect ant & press OK to cal | | |
| MHz | dBmV | Isolation |
| 97.1 | -13 | |
| 99.5 | -17 | |
| 105.7 | -21 | |

Figure 12

| Noise Immunity Test |  |  |
|---|---|---|
| FAIL | | |
| connect coax & press OK | | |
| MHz | dBmV | Isolation |
| 97.1 | -13 | 33 |
| 99.5 | -17 | 25 |
| 105.7 | -21 | 12 |

INGRESS SUSCEPTIBILITY ON RETURN PATH

CROSS REFERENCE TO RELATED APPLICATIONS

The present application is a continuation-in-part of U.S. patent application Ser. No. 11/151,956 filed Jun. 14, 2005 now abandoned entitled "Ingress Susceptibility on return path" and the present application claims priority from U.S. Provisional Patent Application No. 60/950,204 filed Jul. 17, 2007 entitled "Ingress Resistance Test" which are incorporated herein by reference for all purposes.

FIELD OF THE INVENTION

The present invention relates to testing for electromagnetic noise, i.e. ingress in a cable network, and in particular, to determining an ingress susceptibility of a communication network from radio frequency ("RF") signals present on the return path of the cable network.

BACKGROUND OF THE INVENTION

Cable networks are communication systems that typically employ coaxial cables to carry broadband signals between a centralized head end and a plurality of customer premises devices. In addition to coaxial cables, many conventional cable networks also include fiber optic lines. Such networks are sometimes called hybrid fiber coax (HFC) networks.

Cable networks have historically been used primarily for the delivery of the television program signals. To this end, a cable network head end typically broadcasts a broadband multi-channel television signal to a plurality of subscribers through a hierarchical interconnection of coaxial cable and/or fiber optic lines which is often referred to as the cable plant. The multi-channel television signal is typically composed of a plurality of different program signals conveyed over separate frequency channels, each channel occupying an approximately 6 MHz wide subband of the overall broadband signal.

While cable service providers have been broadcasting analog NTCS standard television signals for years, they are increasingly converting to digital television signal broadcasting to take advantage of better cost/service ratios. Another increasing trend in cable networks is the addition of two-way high-speed digital data communication. A customer may thus use its cable network connection to obtain both television broadcast programming and to access the Internet for electronic mail, downloads, and browsing. Additionally, an increasing number of HFC networks are also being configured to support a specialized form of digital telephone service known as Voice over Internet Protocol (VoIP). Thus, in addition to reliable downstream data transmissions from cable network head ends to respective subscriber sites, many of the newer and emerging digital services also require increasingly reliable upstream data transmissions from subscriber sites to their respective cable network head ends.

Coaxial cables and connectors are designed to be shielded and prevent over-the-air signals from mixing into the signals carried over the center conductor; however, electromagnetic noise, i.e. ingress, from common external devices, such as hair dryers, washing machines, vacuum cleaners, blenders, bread makers, remote control cars, cordless phones, ham radio, machinery, microwave ovens, at or near the same frequency as desired signals, can dramatically reduce the reliability of upstream data transmissions in a cable network. Coaxial home wiring networks are particularly susceptible to ingress noise if the shielding, connectors, or terminations are substandard or damaged.

The hierarchical nature of the typical cable plant tends to increasingly concentrate and amplify ingress in the return path, i.e. the frequency band used for upstream communications, typically occupying about 5 MHz to 45 MHz under United States standards or about 5 MHz to 65 MHz under European standards, as data flows from the subscriber sites to the head end. Without proper precautions, the resulting signal-to-noise ratio (SNR) at the head end can drop low enough to significantly impair the head end's ability to decode messages from subscriber sites.

Determining specifically what should be done to harden a cable network against ingress typically involves field-testing, to locate points of vulnerability and quantify relative degrees of susceptibility in the return path. Once a vulnerable point is located, steps can be taken to sufficiently harden the affected network branch and/or node against ingress. In some cases, the remedy may be as simple as replacing a chaffed cable or tightening a loose connector to provide sufficient electromagnetic shielding through the affected branch and/or node.

Cable service providers have often used handheld signal measurement equipment to help diagnose various communications problems and perform network analyses. However, historical ingress test apparatuses and methods have required dedicated radio frequency (RF) test signal generating features. Generating dedicated RF test signals has been undesirably costly and complex. Moreover, generating dedicated RF signals can pose undesirable challenges in that return path frequencies typically overlap with commercial aviation bands, and thus the dedicated RF test signals must be generated and used in ways that avoid high power broadcasting and/or leakage that may interfere with aviation communications. Additionally, apparatuses and methods including dedicated test signals have been undesirably complex and time consuming for technicians to setup and operate in the field.

The problem for network operators is complicated by the fact that noise sources are neither always present nor constant in level or frequency. At the time of installation or troubleshooting of services, noise sources may not be present and as such the measurement of ingress noise on the cable plant will be low or not present, even if the coaxial plant has shielding integrity issues. Since most installations are performed during the daytime, when the homeowners and their neighbors are at work, i.e. when there is the lowest level of noise sources turned on in the home, technicians may be unaware of the potential problem of ingress noise.

Accordingly, services can be installed and working within acceptable levels during the installation, however, at a later time when off-air noise sources are turned on, the services may be affected. The net result is repeat service calls and/or unhappy and dissatisfied customers.

The challenge is to proactively identify and locate poorly shielded cable or connectors in coaxial networks with susceptibility to ingress noise at the time the technician is in the home, so that weak spots in the cable plant can be fixed and thus prevent customer observed service impairments, without the noise and ingress sources being present at the time.

SUMMARY OF THE INVENTION

The present invention relates to an apparatus for testing ingress into a subscriber network, which includes an access point to a communication network, comprising:

a radio frequency (RF) input connectable to the access point, which is disconnected from the communication network, for receiving RF signals ingressed into the subscriber network from outside sources;

a signal processor operably coupled to the RF input, the signal processor operable to scan the RF signals for power levels at a plurality of frequencies, and operable to generate power level signals based at least in part on the power levels of the RF signals at the plurality of frequencies; and a controller operably coupled to the signal processor, the controller operable, in response to at least one user input command, to cause the signal processor to scan the RF signals for the power levels at the plurality of frequencies spread over at least one predetermined frequency band;

wherein at least one of the controller and the signal processor is operable to indicate an ingress susceptibility of the subscriber network in at least one human-perceptible form based at least in part on the power level signals.

In an alternative embodiment, the present invention provides a method of testing ingress into a subscriber network, which includes an access point to a communication network, with a testing device comprising the steps of:

a) connecting the testing device to the access point disconnected from the communication network;

b) scanning radio frequency (RF) signals from the subscriber network for power levels at a plurality of frequencies spread over at least one predetermined frequency band; and c) indicating an ingress susceptibility of the subscriber site in at least one human-perceptible form based at least in part on the power levels.

Another aspect of the present invention relates to apparatus for testing ingress into a subscriber network, which includes an access point to a communication network, comprising:

input means for connecting to the access point and receiving radio frequency ("RF") signals from the subscriber network disconnected from the communication network;

scanning means for scanning the RF signals for power levels at a plurality of frequencies, and for generating power level signals based at least in part on the power levels; and user interface means for receiving at least one user input command for initiating the scanning means to scan the RF signals for the power levels with the plurality of frequencies spread over at least one predetermined frequency band in response to the at least one user input command;

wherein the user interface means is operable to indicate an ingress susceptibility of the subscriber site in at least one human-perceptible form based at least in part on the power level signals.

BRIEF DESCRIPTION OF THE DRAWINGS

The invention will be described in greater detail with reference to the accompanying drawings which represent preferred embodiments thereof, wherein:

FIG. 7 illustrates a scan of frequencies in the FM radio band showing local off-air signal strength in a home under test;

FIG. 8 illustrates a scan of frequencies in the FM radio band showing signal strength from a coaxial cable in a living room of the home under test of FIG. 7;

FIG. 11 illustrates a display screen of the testing device of FIGS. 2 and 5 displaying an uncalibrated FAILed test; and FIG. 12 illustrates a display screen of the testing device of FIGS. 2 and 5 displaying a calibrated FAILed test.

DETAILED DESCRIPTION

Figure 1:
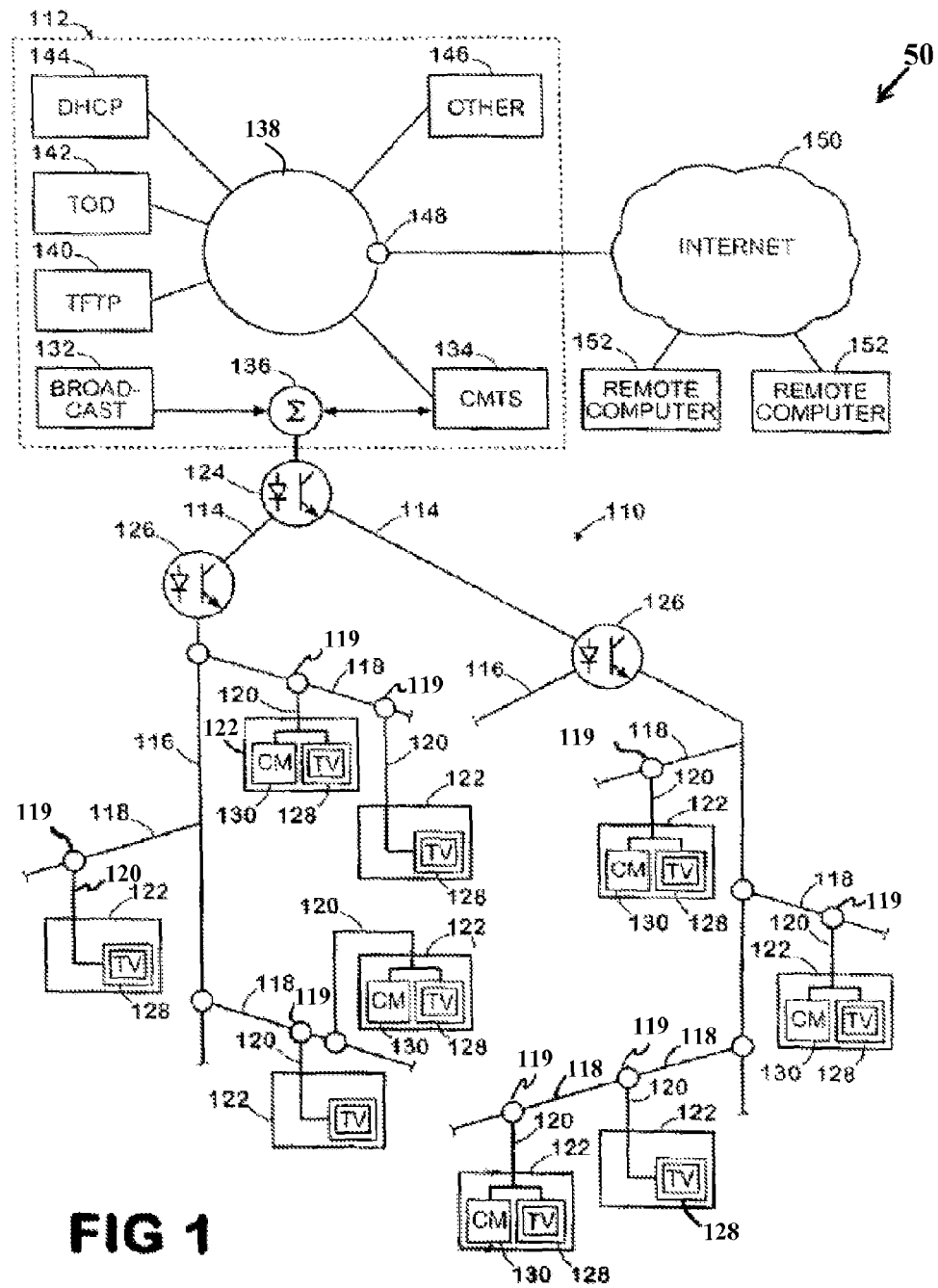
FIG. 1 illustrates an exemplary multifunctional cable services system.

Like reference numerals refer to like parts throughout the following description and the accompanying drawings.

With reference to FIG. 1, a multifunctional cable services system 50 includes a communication network 110, which is a land-based broadband network, typically known as a cable network. In the exemplary embodiment, communication network 110 is a hybrid fiber coax (HFC) network that employs both fiber optic links 114 and coaxial cable links 116 to effect radio frequency (RF) communications between a plurality of subscriber sites 122 and a network headend 112. The network headend 112 is further operable to provide Internet communications between a plurality of subscriber sites 122 and one or more devices 152 connected to the Internet 150. The devices 152 are external to communication network 110.

The communication network 110 includes the network headend 112, the fiber optic links or "plant" 114, the coaxial cables or "plant" 116, a plurality of cable network tap lines 118, a plurality of subscriber drop points or taps 119, a plurality of subscriber drop lines 120, and a plurality of subscriber sites 122. In the exemplary embodiment, a headend optical encoder/decoder 124 connects the network headend 112 to the optic fiber plant 114, and the node optical encoder/decoders 126 connect the optic fiber plant 114 to the coaxial cable plant 116. As known in the art, the optic fiber plant 114 provides communication between discrete portions of the network 110 and the headend 112. The coaxial cable plant 116 distributes a network communication line within each discrete portion of the communication network 110.

Both the optic fiber plant 114 and the coaxial cable plant 116 are operable to propagate broadband signals, including but not necessarily limited to signals ranging from about 4 MHz to about 1000 MHz. The frequency spectrum is divided into channels that are approximately 6 MHz or 8 MHz wide and includes carrier frequencies that are used to define the respective channels. In general, a carrier signal at the channel frequency is modulated with an information signal using either analog or digital techniques to provide content for the channel.

The headend 112 includes a source of broadcast program information 132, a cable modem termination system (CMTS) 134, a combiner 136, and a server network 138. The CMTS 134 is operably coupled to the combiner 136 and the server network 138. The source of broadcast program information 132 is also coupled to the combiner 136. The combiner 136 is operably connected to the optical encoder/decoder 124.

The source of broadcast program information 132 may be any suitable well-known device or set of circuits that obtain broadcast audio and/or visual information for broadcast over the communication network 110. For example, the source of broadcast program information 132 generally provides local television channels, subscription television channels, pay and free audio channels, free non-local television channels, television guide information and the like.

The CMTS 134 is a device, known in the art, which communicates data to and from the cable modems 130 connected to the network 110 via the optic fiber and cable plants 114 and 116, respectively. In one embodiment, the CMTS 134 is compatible with at least DOCSIS 1.1 standard, which is known in the art. In other embodiments, the CMTS 134 may be configured for other communication standards, including other DOCSIS standards. The CMTS 134 facilitates communication between the cable modems 130 and other computers on the Internet 150 via the server network 138. The configuration and operation of the CMTS 134 are known in the art.

The server network 138 is, by way of example, a LAN/Ethernet network, which has various servers attached thereto that perform operations necessary to facilitate Internet connections between the cable modems 130 on the communication network 110 and the Internet 150. The servers include, by way of example, a trivial file transfer protocol (TFTP) server 140, a time of day (TOD) server 142, and a dynamic host control protocol (DHCP) server 144. Each of the above servers implements DOCSIS Internet connection functionality. For example, the TFTP server 140 maintains configuration files for each cable modem 130. The configuration file for each cable modem 130 identifies the parameters/constraints of service for the modem 130. The parameters/constraints are often dictated by a level of service purchased for the subscriber site 122 associated with modem 130. For example, the parameters may define the maximum available bandwidth, the number of customer premise devices that may be attached to the modem 130, etc. The time of day server 142 provides time stamp information on certain communications between the modems 130 and the Internet 150. For example, e-mail messages generated by one of the modems 130 may be time-stamped using time information from the TOD server 142. The DHCP server 144 provides the Internet Protocol (IP) address assignment for each of the cable modems 130. In general, as is known in the art, each cable modem 130 requests an IP address when attempting to establish a connection to the Internet 150. The DHCP server 144 performs the operations to obtain the IP addresses.

Additional servers 146 on the server network 138 include servers required to provide Voice over Internet Protocol ("VoIP") services via the communication network 110. The VoIP services provide telephony via an Internet connection through the cable modems 130 of subscribers. As will be discussed below in further detail, subscribers using such services must include additional equipment connected to their cable modem 130. In particular, a device known as a multimedia terminal adapter (MTA), must be connected between their cable modem 130 and the subscriber telephone. Alternatively, the MTA could be integrated with a cable modem, which is known as an embedded MTA (eMTA). Details regarding VoIP services may be found in McIntosh, David, "Building a PacketCable™ Network: A Comprehensive Design for the Delivery of VoIP Services," (SCTE Cable Tec-Expo® 2002, which may be found at www.cablelabs.com), which is incorporated herein by reference.

The server network 138 further includes a router or switch 148 that connects to the Internet 150. Routers 148 that connect a LAN such as the server network 138 to an Internet access point are well known.

Referring to the communication network 110 outside of the headend 112, the headend optical encoder/decoder 124 is coupled to a plurality of optical fibers of the optical plant 114. While FIG. 1 illustrates two optical fibers 114 emanating from the headend optical encoder/decoder 124, the network 110 may suitably include a large number of optical fibers in the fiber optical plant 114. The fibers of the optical plant 114 extend to various geographical areas and terminate in the node optical encoder/decoders 126. Each optical encoder decoder 126 is further connected to downstream coaxial cables of the cable plant 116. Extending from the drop points on cable plant 116 are network tap lines 118. Network tap lines 118 are also constructed of coaxial cable. Extending from each network tap line 118 at the tap 119 is one or more subscriber drop lines 120. Each subscriber drop line 120 provides coaxial cable terminations to each of the subscriber sites 122. As is known in the art, the subscriber sites 122 may be a residence, a commercial or an industrial establishment.

As discussed above, some subscribers have a television 128 operably connected to the subscriber drop line 120, a cable modem circuit 130 connected to the subscriber drop line 120, or both.

In general, the communication network 110 delivers broadband RF signals including a number of frequency channels, each channel having a unique carrier frequency, to each subscriber drop line 120. The carrier signal of each frequency is modulated by information, typically an audio-visual baseband signal, provided from the broadcast information source 132. The audio-visual baseband signal may be a standard analog NTSC signal, or a digital television signal.

To this end, the baseband audio-visual baseband information for each broadcast channel is modulated onto a particular channel frequency carrier and then combined with all of the other channel frequency carriers to form a multi-channel broadband RF signal. The broadband RF signal is provided to headend optical encoder/decoder 124, which converts the broadband RF signal to an optical signal, which then propagates through the optic fiber plant 114 to nodes 126. The nodes 126 convert the optical signal back to a broadband RF signal and then provide the broadband RF signal to the lines of the cable plant 116. The cable plant 116, the network tap lines 118, the taps 119, and the subscriber drop lines 120 cooperate to provide the broadband RF signal to each of the subscriber sites 122. If the subscriber site 122 has a television 128 operably connected to the drop line 120, then the television 128 may tune and display any of a plurality of audio-visual programs within the broadband RF signal.

A portion of the broadband signal is reserved for downstream and upstream data packet communication. In the exemplary embodiment, data packet communication is implemented under transfer control protocol/Internet protocol (TCP/IP) standards, and may be communicated to the remote computers 152 over the Internet 150. The CMTS 134 effectively transmits downstream data packets to the cable modems 130 using known modulation techniques, and receives upstream data packets from the cable modems 130 using known demodulation techniques.

The CMTS 134 prepares upstream packets for transmission over the Internet 150 in accordance with known standards and techniques. The CMTS 134 provides the prepared upstream packets to the router 148, which in turn provides the packets to the Internet 150. The Internet 150 may then provide the data packets to one or more of the remote computers 152.

Such data packets may include electronic mail, http requests, web page information, and any other information normally associated with Internet usage.

Packets of data generated by the remote computers 152 may be transmitted to one of the cable modems 130 of the communication network 110 using a reverse path. VoIP services also use the same path.

As discussed above, the TFTP server 140, the TOD server 142 and the DHCP server 144 also perform operations in Internet communications via the CMTS 134. As is known in the art, the TFTP server 140 includes a configuration on file that defines constraints on the communication parameters for each modem 130, such as bandwidth limitations or the like. As is also known in the art, the TOD server 142 provides time-stamp information to each cable modem 130 for event logging. The DHCP server 144 establishes a dynamic IP address for each of the modems 130 (and associated MTA's, not shown in FIG. 1) when each of the modems 130 attempts to connect to the Internet 150 via the CMTS 134.

Figure 2:
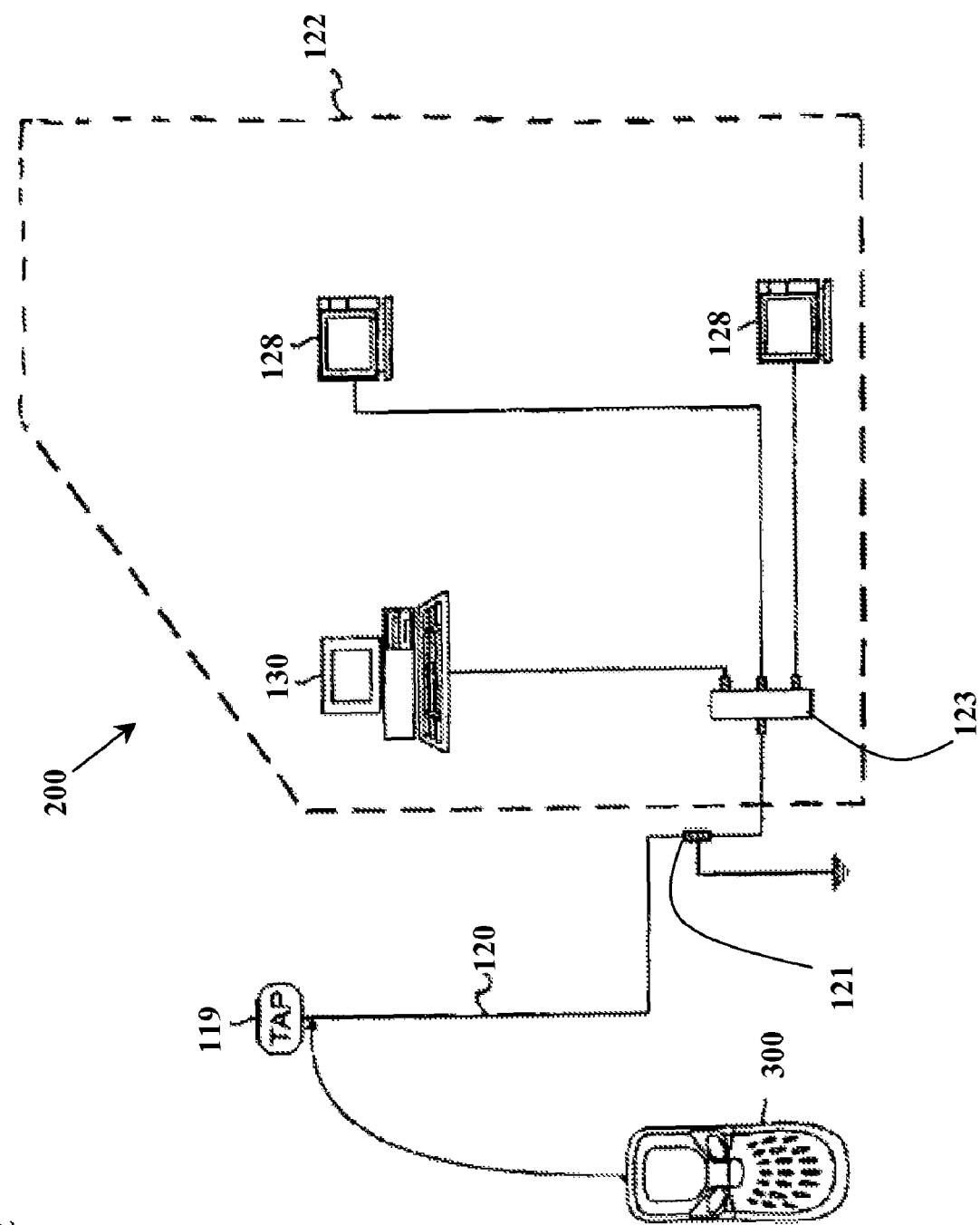
FIG. 2 illustrates an exemplary ingress susceptibility test configuration including an exemplary testing device according to the present invention coupled to a subscriber site through a drop line at a tap.

With reference to FIG. 2, an exemplary ingress susceptibility test configuration 200 includes an exemplary testing device 300 according to the present invention coupled to one of the subscriber sites 122 through an access point, e.g. one of the drop lines 120 at the respective tap 119, ground block 121, or network interface device (NID) 123. In the exemplary embodiment, the testing device 300 is operable to indicate ingress susceptibility as discussed further below. Further, the exemplary testing device 300 may be operable to test other parameters, including by way of example, the signal strength at a remote location of the network 110, whether Internet connectivity is available at remote locations of the network 110, and/or digital channel quality at remote locations of the network 110. The precise combination of such additional features in the analysis device 300 may vary from embodiment to embodiment. In the exemplary embodiment, the testing device 300 is connected directly to the subscriber coax drop line 120 at the tap 119. In various alternative embodiments, the testing device 300 may also be intended to test or analyze other aspects of the performance of network 110 in a variety of locations, particularly locations proximate one or more subscriber premises sites 122. A service provider, i.e. a party that provides communication services via network 110, often receives notification of trouble in the network 110 through customer complaints, but because the customer can typically only describe visible symptoms of a problem, e.g. cable modem won't connect, slow internet connectivity, fuzzy television picture, etc., actual diagnosis of the problem often requires testing that is performed at the complaining subscriber's premises.

Figure 3:
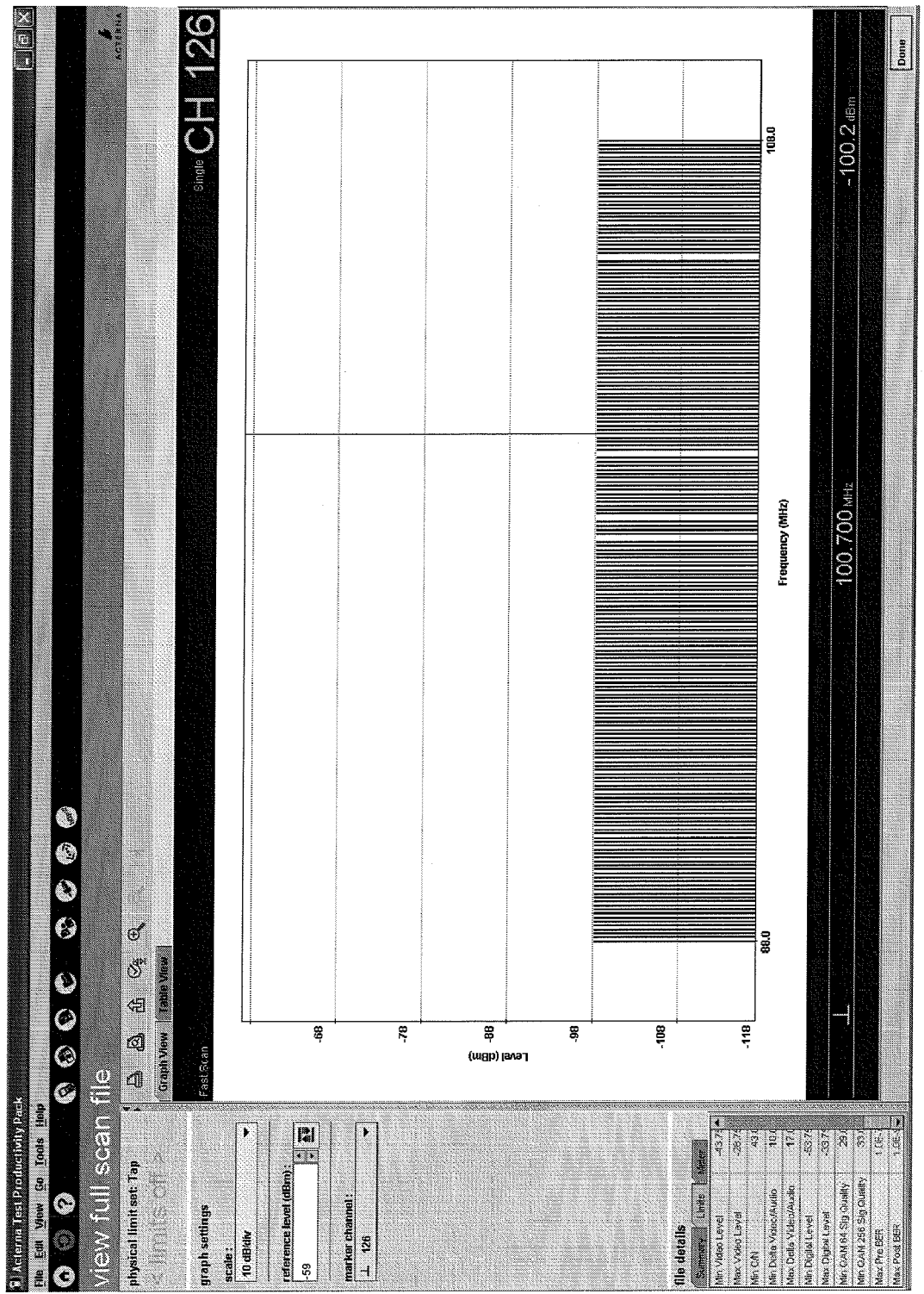
FIG. 3 illustrates a scan of frequencies in the FM radio band in a home network performed at a main junction point outside the home.
Figure 4:
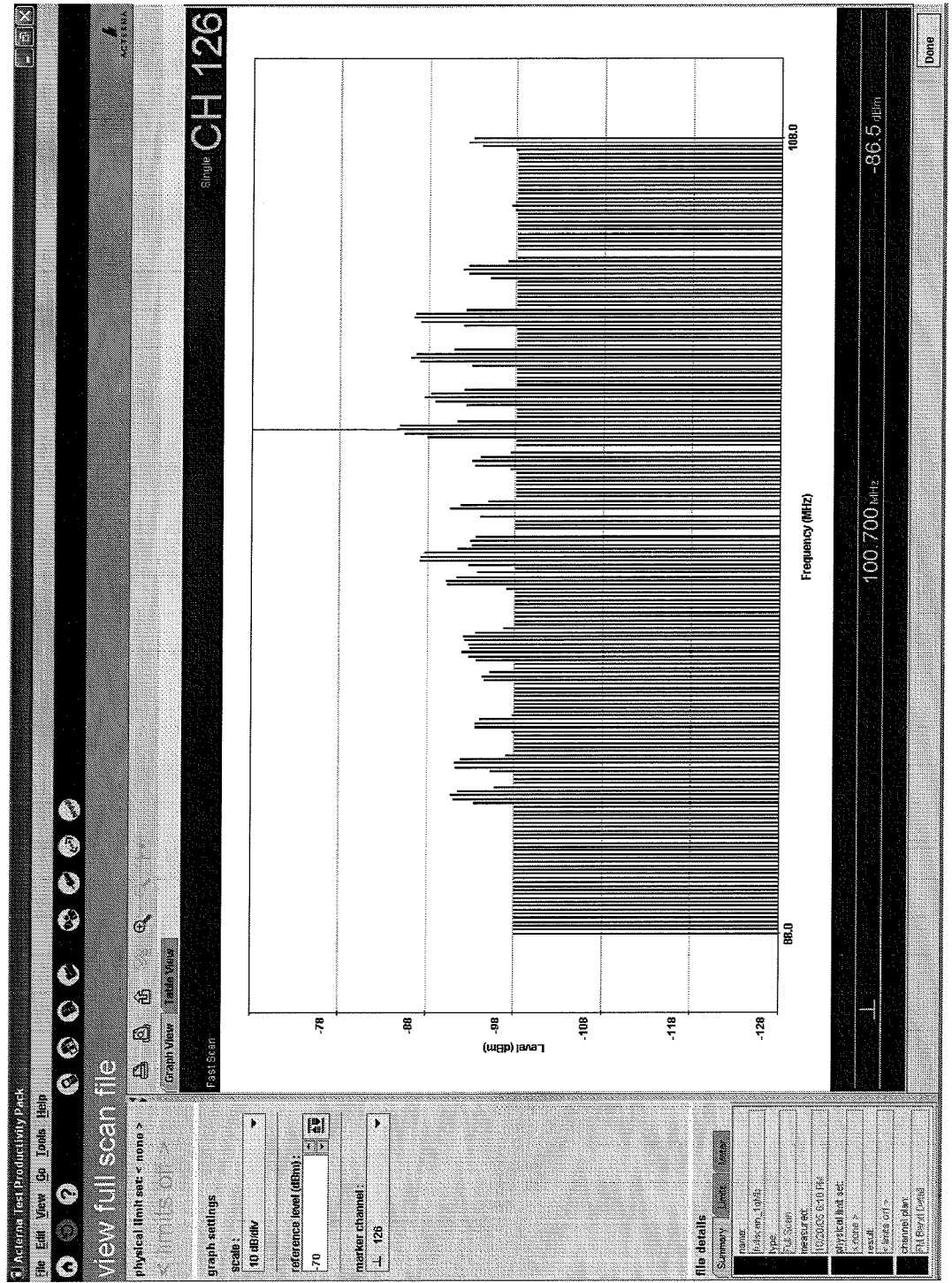
FIG. 4 illustrates a scan of frequencies in the FM radio band from a poorly shielded home network in which FM signals compromised the coax shielding and ingressed into the home network.

A properly shielded home coaxial network should not allow any off-air signals to ingress into network. FIG. 3 illustrates a scan of frequencies in the FM radio band in a home network performed at a main junction point outside the home (ground block). The illustrated home network is well shielded with no FM signals, i.e. less than −98 dBm, penetrating into the network at frequencies between 88 MHz and 108 MHz. Comparatively, FIG. 4 illustrates a scan of frequencies in the FM radio band, i.e. 88 MHz to 109 MHz, from a poorly shielded home network in which FM signals compromised the coax shielding and ingressed, i.e. between −80 dBm and −98 dBm, into the home network. The detection of ingress of FM signals into the coaxial network can be used indicate and locate where other frequencies may also ingress and disrupt services.

Figure 5:
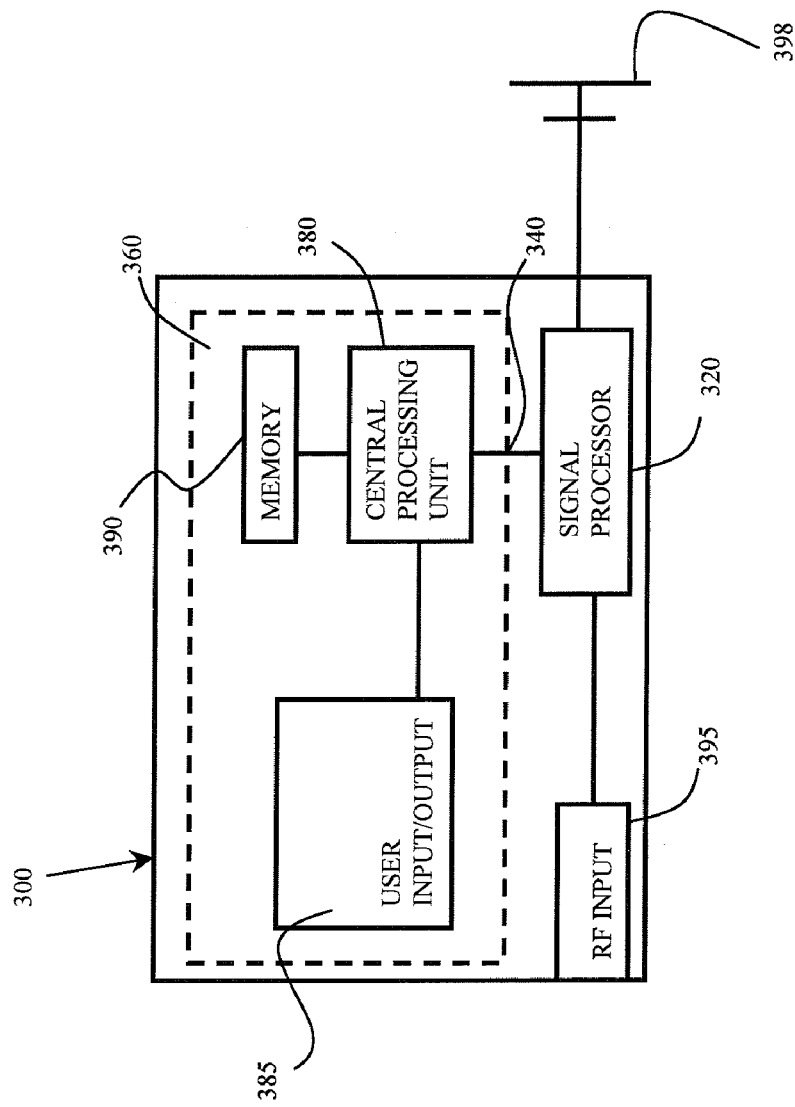
FIG. 5 illustrates a block diagram of the exemplary testing device of FIG. 2.

With reference to FIG. 5, the testing device 300 includes a signal processor 320 connected over an interface bus 340 to a controller 360. The controller 360 includes a central processing unit (CPU) 380 connected to one or more user input/output devices 385 and to one or more additional memory device 390. In the exemplary embodiment, each user input/output device 385 includes typical user interface devices, such as a video screen, a keyboard, a touch screen and/or a printer. More specifically, in the exemplary embodiment the signal processor 320 is implemented from a Hewlett Packard model HP8566® programmable spectrum analyzer or suitably similar circuitry and/or equipment, the bus 340 is implemented from an IEEE 488 interface bus or suitably similar circuitry and/or equipment, and the controller 360 is implemented from a Hewlett Packard model HP9836 computer system or suitably similar circuitry and/or equipment. Among other things, the signal processor 320 is configured to make a plurality of power level measurements of RF signals at different frequencies over a frequency interval or band defined by frequency limits supplied by the controller 360, and is further configured to transfer corresponding power level signals to the controller 360 in response to control signals from the controller 360. To this end, basic operations of the signal processor 320 are well known to those skilled in the art. Nevertheless, additional details of the construction and operation of the HP 8566 programmable spectrum analyzer circuitry incorporated into the exemplary embodiment are provided by the 8566A SPECTRUM ANALYZER REMOTE OPERATION, manual (part No. 08566-90003) available from Hewlett Packard Corporation, which is hereby expressly incorporated by reference. Similarly, additional details of the construction and operation of the HP9836 computer system and the IEEE 488 interface bus are contained in the Tutorial Description of Hewlett Packard Bus Interface available from Hewlett Packard Corporation, which is also hereby expressly incorporated by reference. The exemplary analysis device 300 also includes a radio frequency (RF) input 395 configured to be coupled to a communication network subscriber site drop line 120 (see FIG. 1 and FIG. 4, discussed above) and to convey RF signals from the drop line 120 to the signal processor 320 in a known manner. In an alternate embodiment hereinafter described, a dipole antenna 398 is provided for measuring ambient noise.

Figure 6:
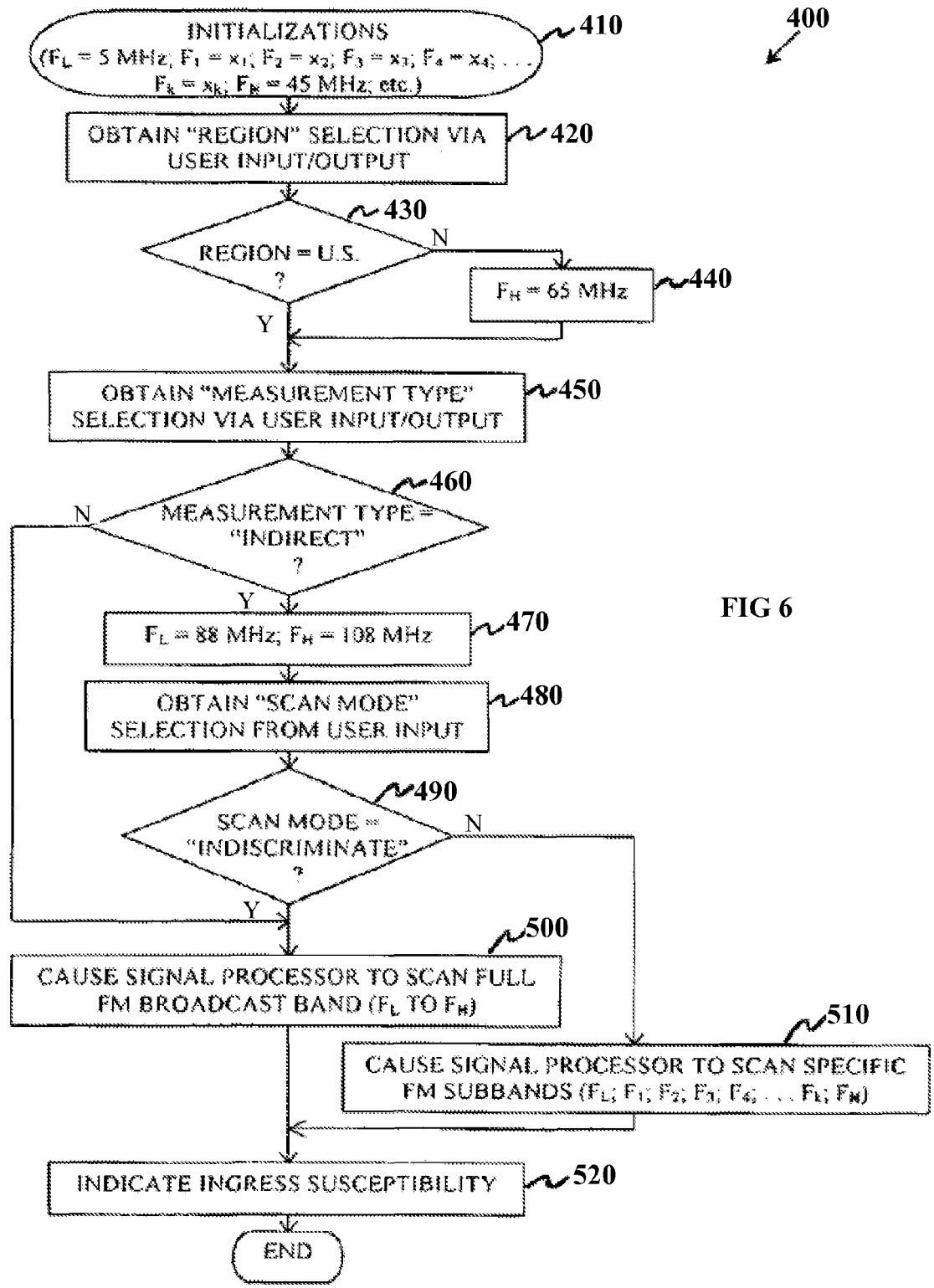
FIG. 6 illustrates a flow diagram of exemplary ingress susceptibility test operations of the exemplary testing device of FIG. 2 according to the present invention.

A flow diagram 400 of exemplary ingress susceptibility test operations of the testing device 300 according to the present invention is illustrated in FIG. 6. In general, during operation of the testing device 300, the RF input 395 conveys RF signals from the subscriber site 122 to the signal processor 320 for analysis, the signal processor 320 measures power levels of the RF signals at a plurality of frequencies under the control of the controller 360 via control signals transmitted from the controller 360 to the signal processor 320 over the bus 340, the signal processor 320 in turn transmits corresponding power level signals to the controller 360 over the bus 340, and the controller 360 converts the power level signals into a human-perceptible indication of the ingress susceptibility of the subscriber site 122.

More particularly, at block 410 the controller 360 initializes operating variables and sends one or more signals to the signal processor 320 that cause the signal processor 320 to initialize as well. In the exemplary embodiment, block 410 operations include the central processing unit 380 setting a low frequency variable, $F_L$, to 5 MHz, setting a high frequency variable, $F_H$, to 45 MHz, and setting a plurality of intermediate frequency variables, $F_k$, to values roughly evenly spaced between $F_L$ and $F_H$ in the memory 390. After block 410, operations proceed to block 420.

At block 420, the controller 360 obtains a "REGION" selection from a user via the user input/output 385. As noted above, the return path for a cable network typically occupies about 5 MHz to 45 MHz under United States standards or about 5 MHz to 65 MHz under European standards. The REGION selection indicates whether the user wants the testing device 300 to make any direct measurement (as opposed to an "INDIRECT MEASUREMENT," discussed further below) of the ingress susceptibility of the subscriber site 122 under United States standards, i.e. over a predetermined frequency band of 5 MHz to 45 MHz, or under European standards, i.e., over a predetermined frequency band of 5 MHz to 65 MHz. In the exemplary embodiment, block 420 operations include the central processing unit 380 causing the user input/output 385 to display one or more prompts for the REGION selection as well as the user input/output 385 receiving one or more user input commands indicating the REGION selection and the user input/output 385 communicating the REGION selection commands to the central processing unit 380. After block 420, operations proceed to block 430.

At block 430, the central processing unit 380 decides whether the REGION selection indicates a desire for the United States return path frequency band. If the central processing unit 380 determines that the United States band is desired then operations skip to block 450; else, operations proceed to block 440.

At block 440, the central processing unit 380 sets the high frequency variable, $F_H$, to 65 MHz. After block 440, operations proceed to block 450.

At block 450, the controller 360 obtains a "MEASUREMENT TYPE" selection from the user via the user input/output 385. As noted above, the return path for a cable network typically occupies about 5 MHz to 45 MHz under United States standards or about 5 MHz to 65 MHz under European standards. The MEASUREMENT TYPE selection indicates whether the user wants the testing device 300 to make a "DIRECT" measurement of the ingress susceptibility of the subscriber site 122 by scanning the actual United States or European return path frequency band (whichever has been selected at block 420, above) or whether the user wants the analysis device 300 to make an "INDIRECT" measurement of the ingress susceptibility of the subscriber site 122 by scanning the generally recognized frequency modulated (FM) radio signal airwave broadcast communications band of 88 MHz to 108 MHz. Here, it is noted that although independent sources of ingress noise within the actual return path band could be intermittent and/or otherwise considerably unreliable, the option for INDIRECT determination of ingress susceptibility via the FM broadcast band, which is sufficiently close in frequency to the actual United States and European return path bands to make a good proxy for them, ensures at least one operating mode that employs a relatively ubiquitous and reliable independent noise source, without the need for dedicated noise signal equipment, setup, and/or generation. In the exemplary embodiment, block 450 operations include the central processing unit 380 causing the user input/output 385 to display one or more prompts for the MEASUREMENT TYPE selection as well as the user input/output 385 receiving one or more user input commands indicating the MEASUREMENT TYPE selection and the user input/output 385 communicating the MEASUREMENT TYPE selection commands to the central processing unit 380. After block 450, operations proceed to block 460.

At block 460, the central processing unit 380 decides whether the MEASUREMENT TYPE selection indicates a desire for INDIRECT measurement of the ingress susceptibility of the subscriber site 122. If the central processing unit 380 determines that INDIRECT measurement is desired then operations proceed to block 470; else, operations skip to block 500.

At block 470, the central processing unit 380 sets the low frequency variable, $F_L$, to 88 MHz and sets the high frequency variable, $F_h$, to 108 MHz. After block 470, operations proceed to block 480.

At block 480, the controller 360 obtains a "SCAN MODE" selection from a user via the user input/output 385. The SCAN MODE selection indicates whether the user wants the testing device 300 to perform an "INDISCRIMINATE" measurement of the ingress susceptibility of the subscriber site 122 by sweeping the entire FM broadcast band (from $F_L$ to $F_H$) with the best resolution available from the signal processor 320 or whether the user wants the testing device 300 to perform a more "DISCRIMINATE" measurement of the ingress susceptibility of the subscriber site 122 only across one or more specific predetermined FM radio broadcast station frequency subbands. In the exemplary embodiment, block 480 operations include the central processing unit 380 causing the user input/output 385 to display one or more prompts for the SCAN MODE selection, as well as the user input/output 385 receiving one or more user input commands indicating the SCAN MODE selection, and the user input/output 385 communicating the SCAN MODE selection commands to the central processing unit 380. After block 480, operations proceed to block 490.

At block 490, the central processing unit 380 decides whether the SCAN MODE selection indicates a desire for an "INDISCRIMINATE" measurement of the ingress susceptibility of the subscriber site 122 as discussed above. If the central processing unit 380 determines that INDISCRIMINATE measurement is desired then operations proceed to block 500; else, operations skip to block 510.

At block 500, the controller 360 causes the signal processor 320 to measure the power levels of the RF signals from the subscriber site 122 across the full FM broadcast band (from $F_L$ to $F_H$) at a plurality of frequencies with the best resolution available from the signal processor 320, and to generate power level signals representative of the power level measurements. After block 500, operations proceed to block 520.

At block 510, the controller 360 causes the signal processor 320 to measure the power levels of the RF signals from the subscriber site 122 across one or more specific predetermined FM radio broadcast station frequency subbands with the best resolution available from the signal processor 320, and to generate power level signals representative of the power level measurements. After block 510, operations proceed to block 520.

At block 520, the controller 360 obtains the power level signals from the signal processor 320, and the central processing unit 380 causes the user input/output 385 to indicate the ingress susceptibility of the subscriber site 122 based on the power level signals as a spectral display, a continuous or stepwise display or tone corresponding to an average of the power levels, a bipolar, i.e. under-limit/over-limit, display or tone corresponding to an average of the power levels, or in any other suitable human-perceptible form.

To measure a home's Ingress Noise Resistance or shielding effectiveness, an external noise source is normally required. Because ingress in the DC at under 45 MHz or in the 800 MHz to 1500 MHz range may be intermittent, and local transmission in those ranges for test purposes is difficult or not permitted by the FCC, the existing FM carriers from 88 MHz to 108 MHz provide a good constant source or external energy. By measuring the received signal strength of FM carriers on a disconnected coaxial home network, a figure of merit, "ingress noise resistance," for the ability to shield against service disturbing ingress can be ascertained. A poorly shielded coax network will allow FM carriers to penetrate or ingress into the home cable network while a properly shielded network will allow minimal FM penetration or ingress. The effectiveness of the coaxial shielding and connections to block ingress in the FM band is directly correlated to the ability to block ingress in any other frequency range, specifically in the low frequency range, i.e. up to 45 MHz DC, where the coaxial attenuation is the lowest.

A key benefit of using the Ingress Resistance Test of the present invention as a supplement to scanning in the return band, e.g. 5 MHz to 45 MHz, is that the FM band provides a readily available and steady constant source, while ingress in the 5 MHz to 45 MHz band is typically limited to intermittent sources such as AC Motors, fluorescent light dimmers, cordless phones, remote controlled cars, etc. that may not be operating when a technician is looking at that portion of the spectrum.

The Ingress Resistance Test of the present invention may be used to characterize individual coaxial runs within a single home network and identify the shielding effectiveness. The goal of the individual tests is to quickly identify poorly performing runs, and fix the cables before leaving an installation, to prevent future service call backs and improve customer satisfaction.

Figure 9:
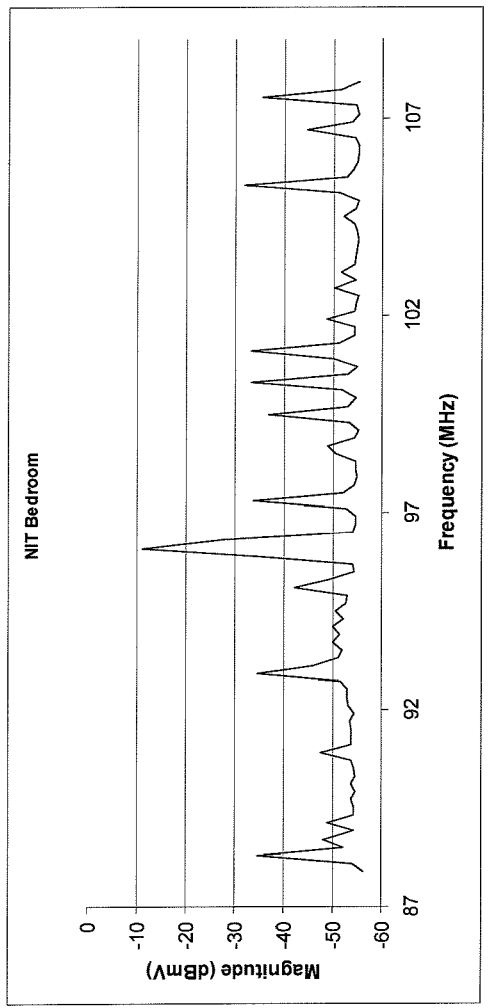
FIG. 9 illustrates a scan of frequencies in the FM radio band showing signal strength from a coaxial cable in a bedroom of the home under test of FIG. 7.
Figure 10:
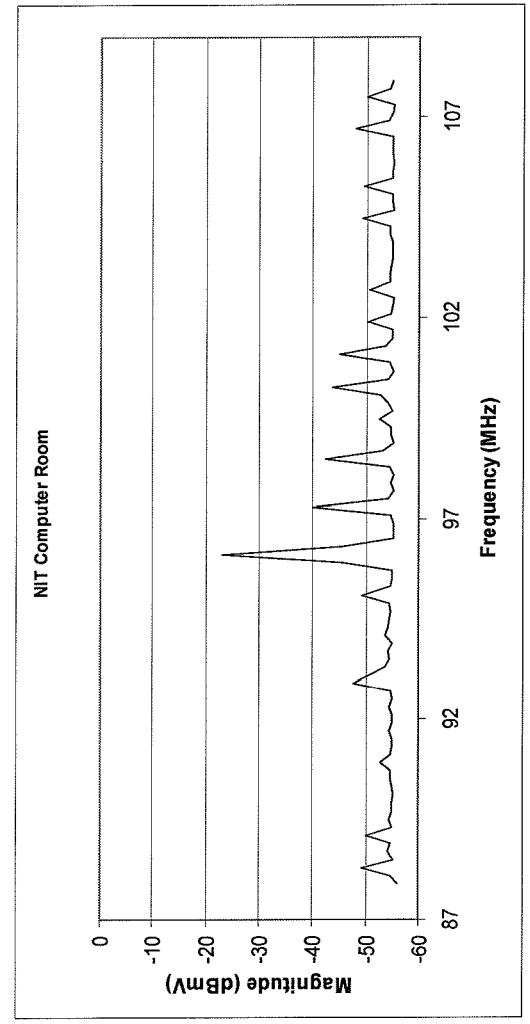
FIG. 10 illustrates a scan of frequencies in the FM radio band showing signal strength from a coaxial cable in a computer room of the home under test of FIG. 7.

FIGS. 7 to 10 illustrate shielding effectiveness variations within a single home network. All data was taken on the field-testing device 300 using the Ingress Resistance Test, according to the present invention. First, as illustrated in FIG. 7, data was collected on local off-air signal strength in the FM radio band in a home under test by connecting the dipole antenna 398 directly to the field test set 300 and saving the results, which include a high peak (6 dBmV) at 96.1 MHz, in the memory 390. Next, individual Ingress Resistance tests were taken at thee separate coax outlets in different rooms of the house, i.e. living room, bedroom and computer room, as illustrated in FIGS. 8 to 10, respectively. The shielding effectiveness of each run of coax to the separate rooms was calculated from the scans. The 45 dB of shielding effectiveness at 96.1 MHz of the first run in the Living Room, i.e. FIG. 8, is acceptable and should provide sufficient shielding against ingress noise sources. However, the second run in the bedroom in the same house, i.e. FIG. 9, provided only 11 dB of shielding effectiveness at 96.1 MHz, and was unlikely to provide resistance to ingress noise to reliably provide services over time. The remaining coax run in the computer room, i.e. FIG. 10, was marginal in performance, and provided 23 dB shielding effectiveness at 96.1 MHz.

The Ingress Resistance Test, according to an embodiment of the present invention, simplifies the interpretation of the results in Block 520 above by enabling a threshold of acceptable noise ingress to be set indicative of a Pass or a Fail. The Pass/Fail test indicators enable technicians to make consistent and clear decisions providing more universal and reliable results across technicians groups. Pass/Fail indicator thresholds are programmable into the central processing unit 380 by the end user via the user input/output 385, and can be fixed for field technicians. Programmability is necessary since end users may be deploying different equipment and services over time with different signal types and protocols. Certain protocols and services are more tolerant of noise than others. In addition, operator philosophies vary for repeat service calls versus proactive replacement costs.

According to an exemplary embodiment of the present invention modern home coaxial networks should have minimum 50 dB of shielding effectiveness in the FM band by design, i.e. the threshold of acceptable noise ingress should be set at −50 dBmV. Substantially less than 50 dB is indicative of a significantly damaged cable run, splitter or connector, or poor workmanship. Damaged cable and connectors are not likely to improve over time and are more likely to degrade.

In practice, −30 dBmV is a practical threshold for absolute FM ingress levels, when typical off-air signal strength is between −10 dBmV and +10 dBmV. On average, operators have converged on 30 dB of shielding effectiveness as a decision threshold for replacement of connectors, splitters, or coaxial runs. Based on this practical experience and theoretical performance expectations the preferred embodiment of the present invention creates a pass or fail conditional threshold based on 30 dB of shielding effectiveness.

According to another embodiment of the present invention, the Pass/Fail thresholds are used in a two step testing process, in which the first step is similar to the process detailed in FIG. 6, wherein an un-calibrated measurement is taken and tested vs the threshold value. In a second, calibrated, step, a pass/fail analysis is performed, if the Fail threshold is exceeded.

In the first step the user performs an Ingress Resistance Test using testing device 300, as defined above, on the home coax network 122 at the main outside interface to the customer premises, e.g. the tap 119, ground block 121, or network interface device (NID) 123. The test result issues a pass/fail notification based on absolute regional or FM frequency band signals measured on home coax network, e.g. whether the ingress is above the default threshold is −30 dBmV. Any signal reading over the default −30 dBmV reading will result in a Fail condition, as illustrated in FIG. 11 in which −13 dBmV, −17 dBmV and −21 dBmV readings were recorded at 97.1 MHz, 99.5 MHz and 105.7 MHz, respectively, all above the −30 dBmV threshold value.

When a Fail condition is determined in the first test, a calibrated test is preferably performed to further evaluate the coax network 122 taking the level of ambient noise into account. The calibrated reference test requires the user to disconnect the testing device 300 from the home network 122 and take a reference off-air FM signal strength reading using the dipole antenna 398, e.g. similar to FIG. 7. Then, the central processing unit 380 automatically calculates a comparative/relative shielding effective value from the difference of the reference off-air FM signal strength to the signal strength on the closed coaxial network, e.g. FIGS. 8 to 10. Calibrated tests are recommended in areas in which the FM signal strength is very high to prevent replacing cable that may be performing well, but subject to abnormally high off-air levels. The recommended and default Pass/Fail threshold for relative shielding effectiveness in the calibrated test is 30 dB. Thus, a fail rating, as in FIG. 12, will be indicated when the difference between the reference off-air FM signal strength and the on-network signal strength is less than 30 dB, i.e. the cable is providing 30 dB of isolation from outside noise. In the illustrated example the tested cable provides more than 30 dB of isolation at 97.1 MHz, which would normally be enough to pass, but the isolation provided by the cable at 99.5 MHz and 105.7 MHz is 25 dB and 12 dB, respectively, which is below the testing threshold, and therefore results in a failed test.

We claim:

1. An apparatus for testing ingress into a subscriber network, which includes an access point to a communication network, comprising:

a radio frequency (RF) input connectable to the access point, which is disconnected from the communication network, for receiving RF signals ingressed into the subscriber network from outside sources;

a signal processor operably coupled to the RF input, the signal processor operable to scan the RF signals for power levels at a plurality of frequencies, and operable to determine power level measurements based on the power levels of the RF signals at the plurality of frequencies; and a controller coupled to the signal processor, the controller operable, in response to at least one user input command, to cause the signal processor to scan the RF signals for the power levels at the plurality of frequencies spread over at least one predetermined frequency band;

wherein at least one of the controller and the signal processor is operable to indicate an ingress susceptibility of the subscriber network in at least one human-perceptible form based on the power level measurements.

2. The apparatus according to claim 1, wherein the at least one predetermined frequency band includes a first predetermined frequency band extending from about 88 MHz to about 108 MHz.

3. The apparatus according to claim 2, wherein the at least one predetermined frequency band also includes a second predetermined frequency band extending from a first frequency limit to a second frequency limit, the first frequency limit being about 5 MHz and the second frequency limit selected from the group consisting of 45 MHz and 65 MHz.

4. The apparatus according to claim 3, wherein the plurality of frequencies are limited to a plurality of frequency subbands within the first and/or the second predetermined frequency bands.

5. The apparatus according to claim 4, wherein the controller is further operable to cause communication of at least one of: a first prompt for a first user input indicative of a selection of the first frequency limit and the second frequency limit, a second prompt for a second user input indicative of a selection between the first predetermined frequency band and the second predetermined frequency band, and a third prompt for a third user input indicative of a selection to limit the plurality of frequencies to the plurality of frequency subbands within the first and/or second predetermined bands.

6. The apparatus according to claim 1, wherein the at least one human-perceptible form includes a visually perceptible uncalibrated pass or fail indicator; and wherein the controller is operable to conduct a first comparison to compare the power levels of the RF signals at the plurality of frequencies to a predetermined threshold power level, and wherein the controller is operable to effect the uncalibrated pass or fail indicator based on the first comparison.

7. The apparatus according to claim 6, further comprising a device for measuring a scan of ambient RF signals for reference power levels at the plurality of frequencies;

wherein the controller is operable to conduct a second comparison comparing the power levels of the RF signals at the plurality of frequencies to the reference power levels at the plurality of frequencies;

wherein the at least one human-perceptible form also includes a visually perceptible calibrated pass or fail indicator;

wherein the controller is operable to effect the calibrated pass or fail indicator based on the second comparison; and wherein the controller only conducts the second comparison when the first comparison results in a failure.

8. The apparatus according to claim 1, further comprising a device for measuring a scan of ambient RF signals for reference power levels at the plurality of frequencies;

wherein the controller is operable to conduct a first comparison comparing the power levels of the RF signals at the plurality of frequencies to the reference power levels at the plurality of frequencies, and wherein the controller is operable to indicate the ingress susceptibility of the subscriber site based on the first comparison.

9. The apparatus according to claim 8, wherein the controller is operable to conduct a second comparison comparing the first comparison to a predetermined threshold power level;

wherein the at least one human-perceptible form includes a visually perceptible pass or fail indicator; and wherein the controller is operable to effect the pass or fail indicator based on the second comparison.

10. A method of testing ingress into a subscriber network, which includes an access point to a communication network, with a testing device comprising the steps of:

a) connecting the testing device to the access point disconnected from the communication network;

b) scanning radio frequency (RF) signals from the subscriber network for power levels at a plurality of frequencies spread over at least one predetermined frequency band; and c) indicating an ingress susceptibility of the subscriber site in at least one human-perceptible form based at least in part on the power levels.

11. The method according to claim 10, wherein step b) includes scanning the RF signals over a first predetermined frequency band extending from about 88 MHz to about 108 MHz.

12. The method according to claim 11, wherein step b) further includes scanning the RF signals over a second predetermined frequency band extending from a first frequency limit to a second frequency limit, the first frequency limit being about 5 MHz and the second frequency limit being one of about 45 MHz and 65 MHz.

13. The method according to claim 12, wherein step b) further includes limiting the plurality of frequencies to a plurality of frequency subbands within the first and/or the second predetermined frequency bands.

14. The method according to claim 13, further comprising: generating on a display of the testing device at least one of: a first prompt for a selection of the first frequency limit and the second frequency limit, a second prompt for a selection between the first predetermined frequency band and the second predetermined frequency band, and a third prompt for a selection to limit the frequencies to the plurality of frequency subbands within the first or second frequency bands.

15. The method according to claim 10, wherein step c) includes:

conducting a first comparison, comparing the power levels of the RF signals at the plurality of frequencies to a predetermined threshold power level, and displaying a first pass or fail indicator based on the first comparison.

16. The method according to claim 15, wherein step c) further comprises:

measuring a scan of ambient RF signals for reference power levels at the plurality of frequencies;

conducting a second comparison, comparing the power levels of the RF signals at the plurality of frequencies to the reference power levels at the plurality of frequencies; and displaying a second pass or fail indicator based on the second comparison;

wherein the second comparison is only conducted when the first comparison results in a failure.

17. The method according to claim 10, wherein step c) further includes:

measuring a scan of ambient RF signals for reference power levels at the plurality of frequencies;

comparing the power levels of the RF signals at the plurality of frequencies to the reference power levels at the plurality of frequencies, and displaying the ingress susceptibility of the subscriber site based on the first comparison.

18. The method according to claim 17, wherein step c) further includes:

conduct a second comparison comparing the first comparison to a predetermined threshold power level;

displaying a pass or fail indicator based on the second comparison.

19. An apparatus for testing ingress into a subscriber network, which includes an access point to a communication network, comprising:

input means for connecting to the access point and receiving radio frequency ("RF") signals from the subscriber network disconnected from the communication network;

scanning means for scanning the RF signals for power levels at a plurality of frequencies, and for generating power level signals based at least in part on the power levels; and user interface means for receiving at least one user input command for initiating the scanning means to scan the RF signals for the power levels with the plurality of frequencies spread over at least one predetermined frequency band in response to the at least one user input command;

wherein the user interface means is operable to indicate an ingress susceptibility of the subscriber site in at least one human-perceptible form based at least in part on the power level signals.

20. The apparatus according to claim 19, wherein the at least one predetermined frequency band includes a first predetermined frequency band extending from about 88 MHz to about 108 MHz.

* * * * *